United States Patent

[11] 3,583,438

| [72] | Inventor | Erich Ruchser<br>Stetten, Remstal, Germany |
|---|---|---|
| [21] | Appl. No. | 850,444 |
| [22] | Filed | Aug. 15, 1969 |
| [45] | Patented | June 8, 1971 |
| [73] | Assignee | Firma Herion-Werke DG<br>Fellback, Germany |
| [32] | Priority | Aug. 17, 1968 |
| [33] |  | Germany |
| [31] |  | P 17 51 916.3 |

[54] SAFETY ARRANGEMENTS IN SERVO OPERATED SYSTEMS
5 Claims, 12 Drawing Figs.

[52] U.S. Cl. ................................................... 137/596
[51] Int. Cl. ................................................... F16k 11/10
[50] Field of Search ........................................ 137/596

[56] References Cited
UNITED STATES PATENTS
3,175,470  3/1965  Schwartz et al. ............... 137/596X

*Primary Examiner*—Henry F. Klinksiek
*Attorney*—Nolte and Nolte

ABSTRACT: A safety arrangement for a servosystem where arrangements are provided for safeguarding switching valves in the system and additional safeguarding is provided in the event of pipes in the system failing. The safety arrangement includes two solenoid valves linked through junction valves monitoring the pressure in the servo system so that in the event of a failure or incorrect operation of the device operated by the servosystem, the safety arrangement will automatically stop the machine controlled by the servosystem.

SAFETY ARRANGEMENTS IN SERVO OPERATED SYSTEMS

The invention relates to a safety control arrangements for servo operating devices where the servo operating means may be ducted to and from a pressure consuming device or servo operated device (clutch, brake or operating cylinder of a chuck or the like), by means of a manually actuated solenoid valve.

It is an object of the invention to provide improved safety arrangements in servo operating devices.

It is an object of the invention, in the case of safety control arrangements of the above-mentioned kind, not only to safeguard the switching valves, which are actuated electromagnetically as a rule, but also to provide additional safety such as to monitor the pressure rise and pressure drop before and within the pressure consuming device or devices as such, so that wrong switching actions or broken or leaking pipes which are normally coordinated with the switching valves, cause the plant as a whole to be stopped immediately. This is of special importance in the case of a press control system or of clamping or chucking mechanisms in machine tools, when losses of pressure fluid which can result in accidents and damage to the mechanical plant occur without being noticed within a clamping mechanism, or within a clutch or brake of a press driving gear of a crank-operated press or the like.

The present invention consists in a safety control arrangement for a servosystem comprising a first and a second solenoid value manually releasable, wherein for supervision of a pressure fluid system between the first and second solenoid valves and the servo operated device, the first solenoid valve is arranged to displace a working piston axially displaceable within the pressure system, for actuation of an electric switch when a pressure build up occurs. The arrangement further comprises an actuating system for a first junction valve situated in the pressure fluid feed and return pipes, operable by the displacements of a cam arranged to be driven by the servo operated device in such manner that the valve's switching action intervenes only when erroneous switching operations occur in the system. A force-locked connection is arranged between the first junction valve and the working piston. The first junction valve is displaceably arranged, with respect to the working piston, in such manner that the working piston may be entrained without actuation of a switch. A second junction valve is arranged in series after the second solenoid valve, the second junction valve being operable by the first junction valve by means of pressure fluid, to promptly cause a main return duct of the servo fluid to open when a pressure drop acts on the first junction valve.

In accordance with the invention, it is advisable to combine the first solenoid valve with the first junction valve, inclusive of its terminal switch, into a structural unit, and to combine the second solenoid valve, arranged for electrical operation, into a structural unit with the second junction valve, operated by means of pressure fluid, and these two latter being connected electrically in appropriate manner.

In cases in which the second magnetic valve is arranged in the form of a solenoid valve controlled in auxiliary manner, meaning that a magnetically switched auxiliary multiway valve controls a working piston which for its part controls the pressure fluid feed and return to and from the pressure consuming device, the second junction valve with its electrical terminal switch is situated in the pressure fluid pipe leading to the switching piston and a greater piston area of the junction valve operated by the pressure fluid can be acted upon by the pressure fluid from the first junction valve to ensure that the switching position is established, the pressure fluid being fed in by the first junction valve and drawn off by the same in case of erroneous switching operations.

In another arrangement, this system may also be applied in the case of solenoid switching valves constructed in the form of double solenoid valves connected in parallel. In this case too, a junction valve operated by means of pressure fluid is situated in each of the pressure fluid pipes leading to the switching piston. This arrangement ensures that the pressure consuming device, for example the shaft of a press driving gear, merely requires a cam track or the like, and that in the two essential terminal positions on this cam track or curve, the initial junction valve causes an immediate pressure drop in case of erroneous switching operations in one or both junction valves operated by means of pressure fluid, these later then autonomously and suddenly terminating or preventing a pressure rise before the pressure consuming device, if a breakdown or the like has occurred. It is possible by virtue of built-in terminal switches to interconnect the electrical portion as a whole in such manner that—in case of failure of one of the junction valves or if the first junction valve does not operate under scheduled control—the other elements are also monitored electrically without delay and switched off if appropriate.

According to another feature of a safety control system applicable to a crank-driven press or the like, the cam surface or curve upon reaching the bottom dead center actuates another electrical multiple switch which is coupled to the actuating system of the working piston, which later is also controlled from the junction valve, in such manner that the crank-controlled pressure is returned to its starting condition.

The invention will now be described in detail with reference to the accompanying drawings which illustrate the invention, but in no restrictive sense.

Figure 1:
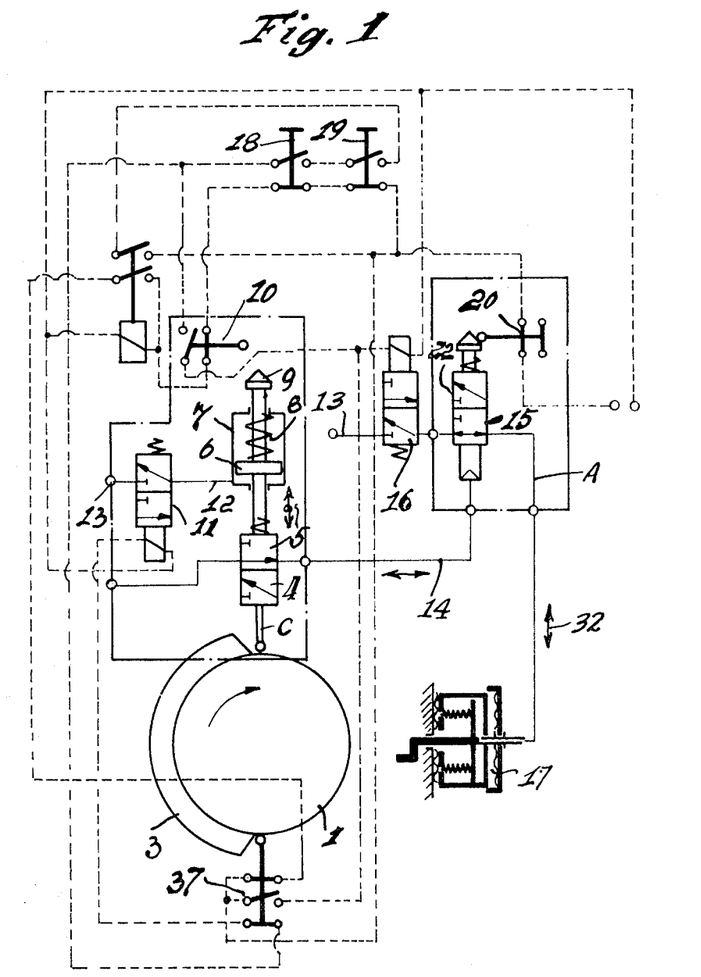
FIG. 1 is a diagrammatical illustration of the safety system according to the invention prior to being switched on, in the case of a press driving gear, for operation of a clutch or of a brake.

In carrying the invention into effect by one convenient mode by way of example the drawings show controls of a press driving gear for a crank-driven press, wherein a clutch or brake is to be operated by means of pressure fluid and safeguarded against failures, even within the pressure fluid system of the clutch or brake. The shaft 1 of the crank-driven press has a cam track 3 and FIG. 1 shows the initial position. In this initial position, cam 3 establishes a low position for a junction valve 4, in the form of a two way valve but obviously replaceable by a three-way valve, which can be pushed upwards and downwards in axial direction in the direction of the arrow 5 by means of the lower abutment which comes into contact with the cam track, that is to say either in the bottom position shown in FIG. 1 or in upper terminal position.

Junction valve 4 is connected to move with a working piston 6 in a casing 7 and, subject to downward biasing by spring 8, this working piston operates a switch 10 through a linkage 9.

Preceding the working piston 6, pressure is fed in from the pressure fluid source 13 through the pressure fluid pipe 12, through the solenoid switching valve 11 which may be actuated electromagnetically or manually. When the pressure in line 12 builds up, the working piston 6 displaces the linking element 9 and concomitantly closes the switch 10.

Figure 2:
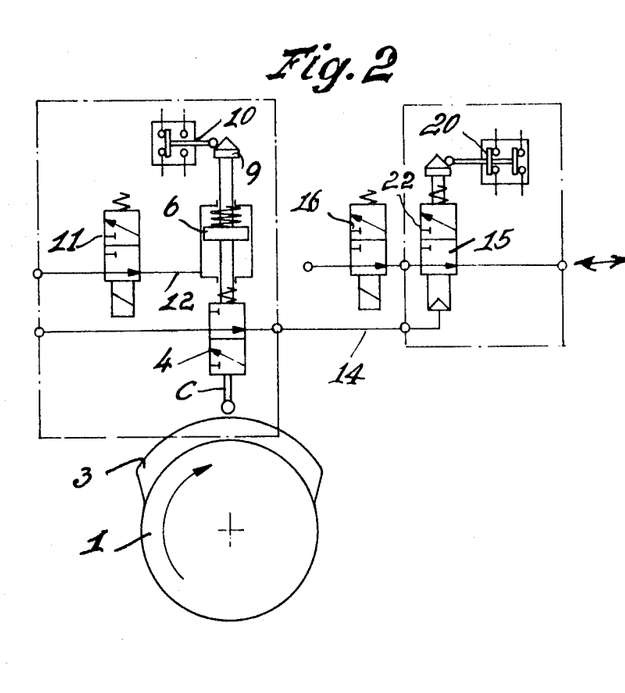
FIG. 2 illustrates the switched-on condition in a simplified form of embodiment. The electrical connecting conductors corresponding to FIG. 1 have been omitted to simplify the illustration.

As apparent from FIG. 2, the junction valve 4 is also lifted at the same time, by virtue of the force-locked connection. The junction valve 4 concomitantly reaches a higher terminal setting than that normally provided by the height of the cam track 3. The junction valve 4 applies a constant pressure through the pipe 14 to a second junction valve 15 which is connected behind the second switching valve 16. The later valves are arranged to supply pressure, by duct A, to the pressure consuming or servo operated device, for example to a clutch or brake of the press driving gear 17. Both solenoid valves 11 and 16 can be actuated by means of two manual switches 18 and 19, subject to control of switch 10, according to the circuit diagram shown, in which connection a slightly earlier switching action on the solenoid valve 11 may be envisaged than on the second solenoid valve 16.

Figure 3:
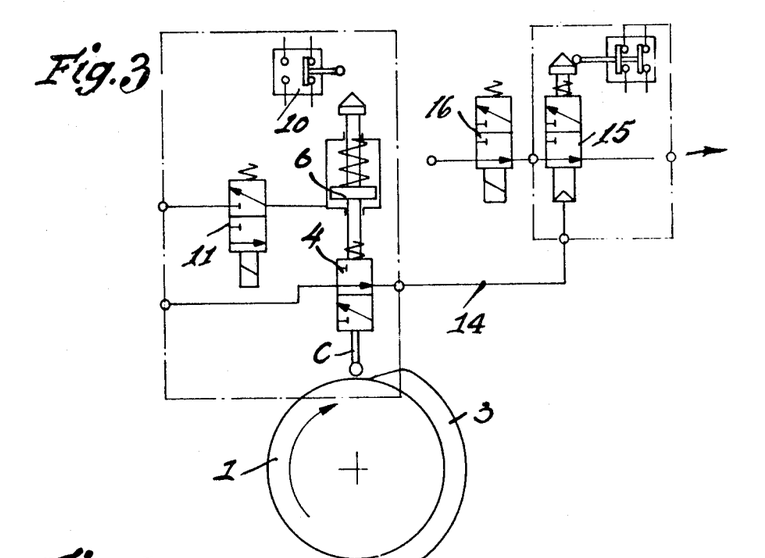
FIG. 3 shows the switched-off condition, of the embodiment of FIG. 2.

The junction valve 15 equally has a terminal switch 20, which within the switching program reflects the displacements performed by the junction valve 15 for electrical safety with respect to the other elements. If a rise in pressure at A is initiated by means of the first solenoid valve 11 under simultaneously slightly delayed actuation of the second solenoid valve 16, in the pressure input system of the pressure consuming device 17, and with the second junction valve 15 under constant pressure at 13, the second junction valve 15 is also biassed at the same time by means of the first junction valve 4, the second junction valve 15 being switched thereby. By means of first solenoid valve 11 moreover, the junction valve 4 is raised beyond the cam track, according to FIG. 2, and the switch 10 is closed. The system then operates as scheduled. A return to the initial position, according to FIG. 3, becomes possible when the cam track 3 leaves the terminal abutment of the junction valve 4 according to FIG. 3, to switch off.

Figure 4:
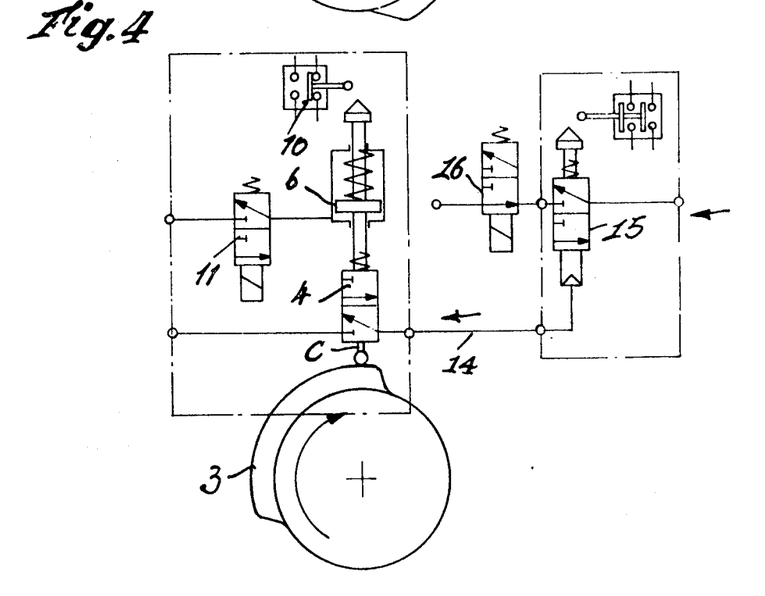
FIG. 4 shows the condition of the system of FIG. 2 upon an erroneous switching action.

If a pressure drop at 13, with an erroneous switching action intervenes, for example as shown in FIG. 4, the cam-following actuator C of junction valve 4 during an attempted traversal of the cam track 3 returns to the cam track 3 and the actuator of the junction valve 4 bears on the same, the junction valve 4 being opened at the same time. The constant pressure of the pressure fluid, still prevailing in the pipe 21 to the junction valve 15, is released suddenly in the direction of the arrow, through the junction valve 4 and the second junction valve 15 is then enabled to release the pressure prevailing ahead of the pressure consuming device 17 (FIG. 1) in the direction of the arrow 32, equally in sudden manner. The plant is then stopped and locked against any other unacceptable intervention since the second junction valve 15 cannot be switched on again for the time being. The switch 20 of the second junction valve is open. The bottom terminal switch 37 ensures that the plant comes to a stop in the initial position, by virtue of the circuit established.

Figures 5, 6:
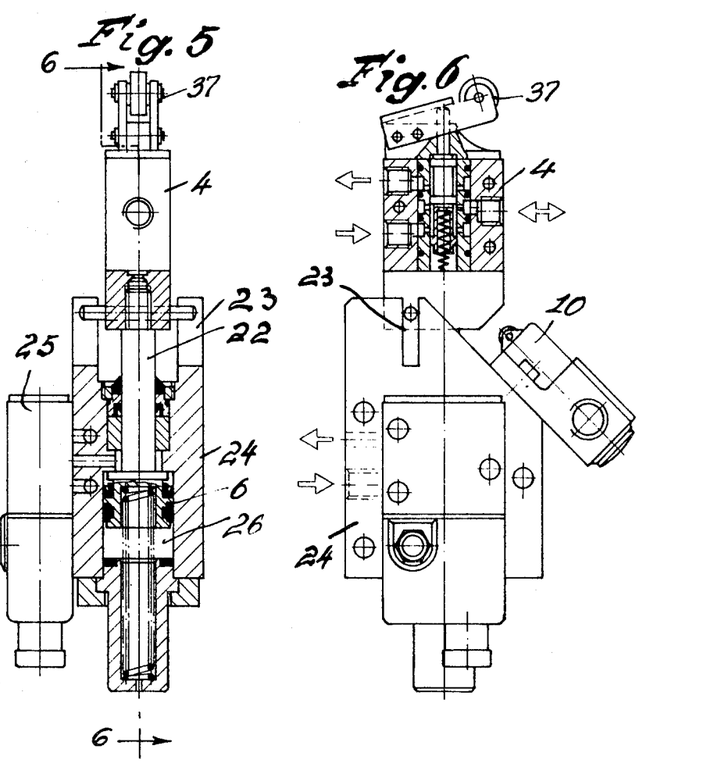
FIG. 5 is a partially sectioned elevational view of a detail from FIG. 1, in less diagrammatic form.
FIG. 6 shows a partial cross section in a view token along lines 6–6 in FIG. 5.

FIG. 5 shows the first junction valve 4 in sideview and this junction valve is fixedly arranged on a linkage 22 and is axially displaceable with this linkage in a slot-shaped or analogous guide 23 relative to the case 24 of the magnetic switching valve 24. To preform the functions described for the example of FIG. 1, the junction valve 4 is operated with the switch 37 known per se, by the cam track or curve 23. The rod 22, which in this embodiment serves as a mechanical actuating element is guided in the case 24 opposite to the working piston 6 which can be connected to the servo feed and return lines by means of the pressure fluid feed and return pipes illustrated. The working piston 6 is acted upon by an adjustable spring 26. As soon as fluid displaces the working piston 6, the junction valve 4 also passes beyond the trajectory of the cam apex to its normal terminal position as illustrated in the example of FIG. 2, that is, in positively actuated manner. If an erroneous switching action occurs, the junction valve returns to the level of the cam track or curve or possibly below the same to the lowest position and mandatorily displaces the working piston 6, the working piston 6 following the junction valve owing to the absence of pressure during a normal erroneous switching action, thereby opening the switch 10. The junction valve is illustrated in sectional end view in FIG. 6 and its fundamental structure is known. The valve case 24 of the solenoid valve has shown thereon the terminal switch 10 which is actuated direct by the evolving displacement of the junction valve 4.

Figure 7:
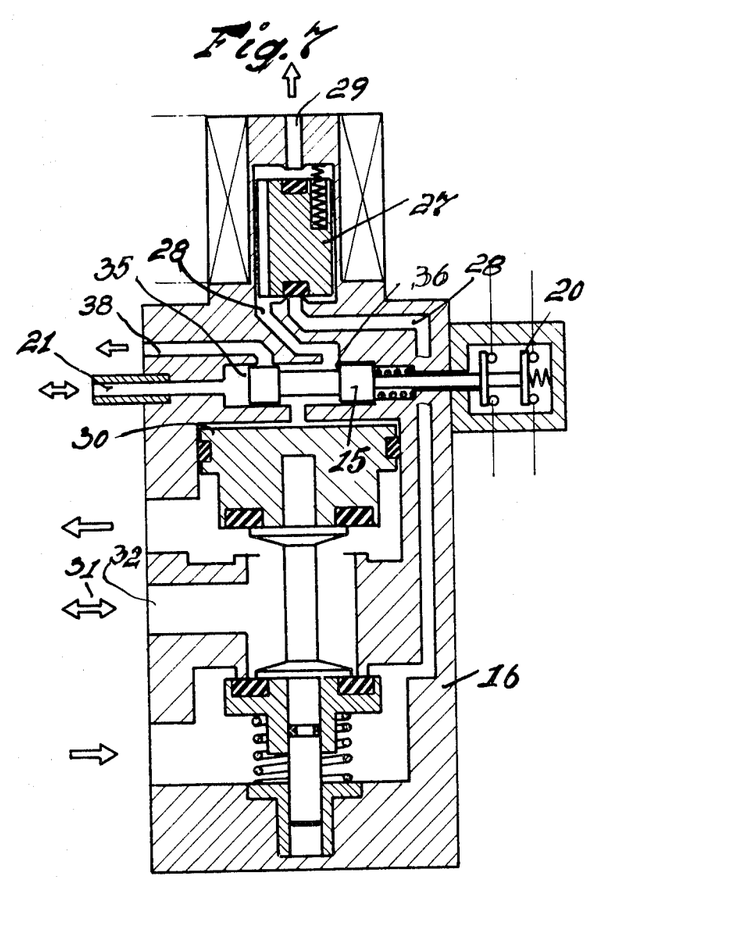
FIG. 7 shows another detail of valve structure in a form similar to that of FIG. 5, in the switched-off position.
Figure 8:
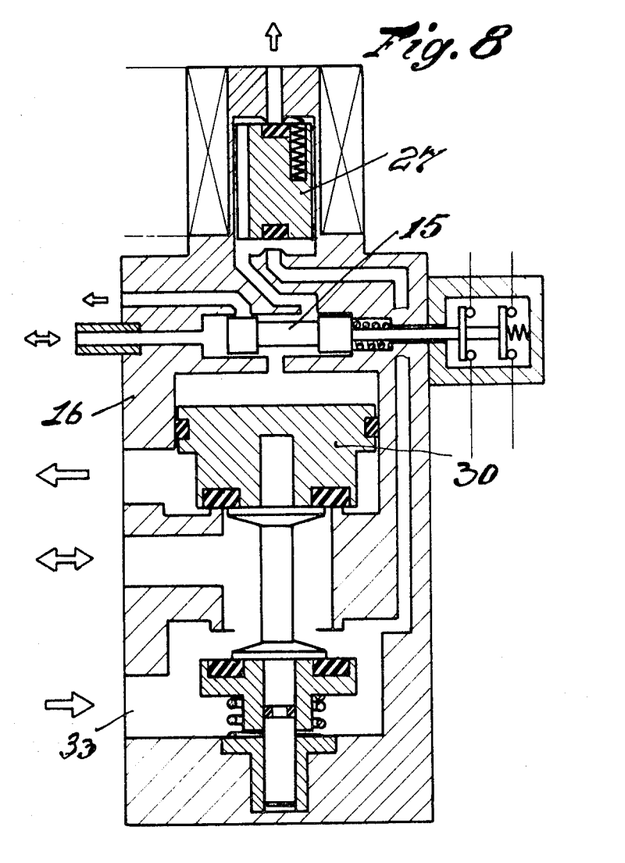
FIG. 8 shows the same valve structure in the switched-on condition.

FIG. 7 shows a longitudinal section of the second solenoid valve whereof the function is known per se. The solenoid valve is concomitantly actuated by means of an auxiliary valve 27 arranged for electromagnetic actuation, the fluid inlet 28 and outlet 29 of the latter causing a pressure rise and a pressure drop, respectively, before the switching piston 30. Not until then does the switching piston 30 actuate the shutoff elements for the pressure fluid buildup and release in the direction of the arrow 31. The union 32 then leads on to the pressure consuming device. The junction valve 15 is then switched into the servo fluid pipe 28 leading to the switching piston 30, and in the switched-off condition illustrated in FIG. 7, this junction valve is acted upon by the pressure in the pipe 21, so that the switch 20 which is connected to the linkage of the junction valve 15, remains closed, because the pressure in the pipe 21 acts on the larger piston area 35 opposed to the smaller cross section 36. When the solenoid valve 16 is switched over by switching the auxiliary valve 27, pressure being applied to this end from the servo fluid inlet 33 on the working piston 30, no further action is performed by the junction valve 15 if the operation of the first solenoid valve 11 and thus of the junction valve 4 evolves in normal manner.

Figure 9:
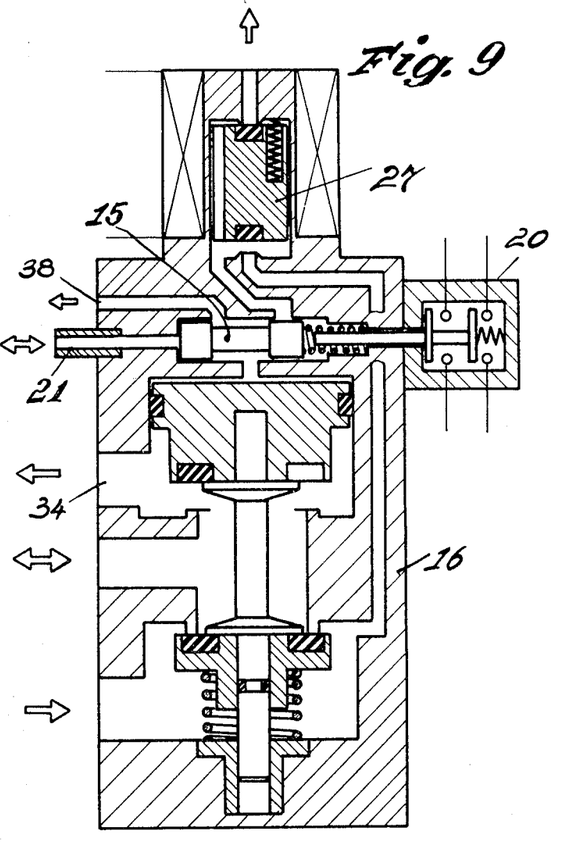
FIG. 9 shows the valve arrangement according to FIG. 7 in case of an erroneous switching action and of pressure release before the switching piston, the electrical switch being open.

If an erroneous switching action intervenes however, according to FIG. 9, the pressure in the pipe 21 is released through the first junction valve 4 and the junction valve 15 assumes the position shown in FIG. 9. The pressure before the switching piston is released suddenly in the direction of the arrow through the return pipe 38 of the junction valve 15 and the pressure consuming device is equally connected to the return pipe 34 of the solenoid valve 16, under simultaneous opening of the switch 20.

Figure 10:
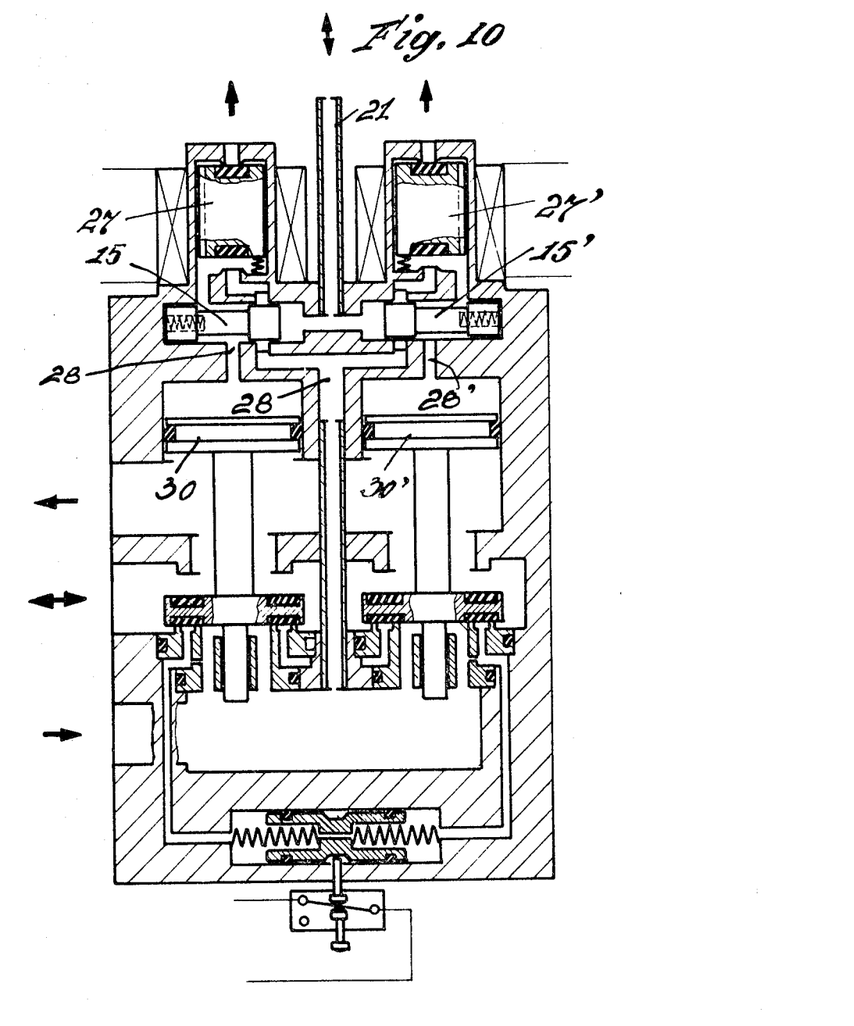
FIG. 10 shows a double valve embodiment connected in parallel, with built-in pressure-fluid-actuated junction valves for each of the individual valves, in the switched-on position.

FIG. 10 shows a solenoid magnetic valve which is constructed in the form of a so-called double valve incorporating solenoid auxiliary valve actuation and whereof the fundamental structure is known per se. In the case of such double valves arranged in parallel, with appropriate report of the pressure condition at the principal shutoff parts through a pressure-comparison system, each of the pipes 28 and 28' which are controlled by the auxiliary valves 27 and 27' now has a junction valve 15 and 15' incorporated therein according to FIG. 7 and these junction valves are also acted upon by the pressure in the pipe 21, that is to say preloaded, and vent the working spaces before the switching piston 30 and 31 for definitive switching over of the double valve no possibility then persisting of reconnecting this double valve to the pressure consuming device.

Figure 11:
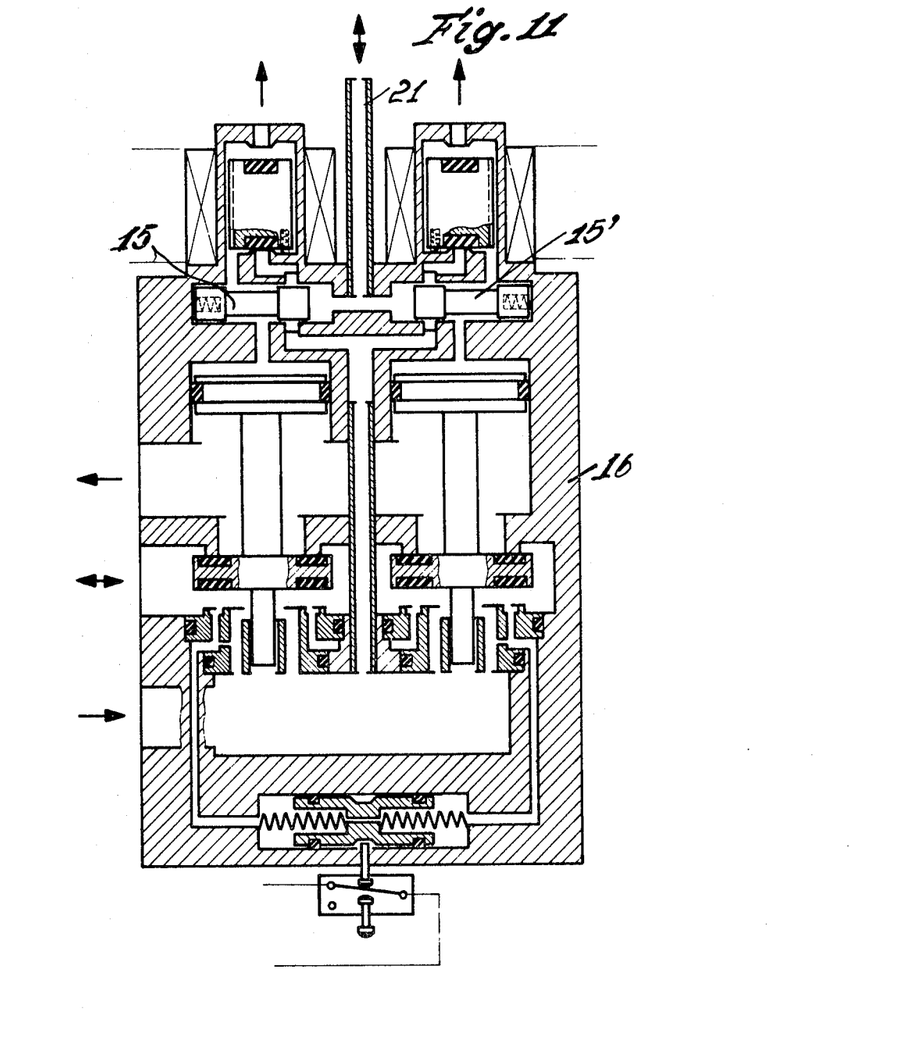
FIG. 11 shows the double valve according to FIG. 10 in the switched-off position.
Figure 12:
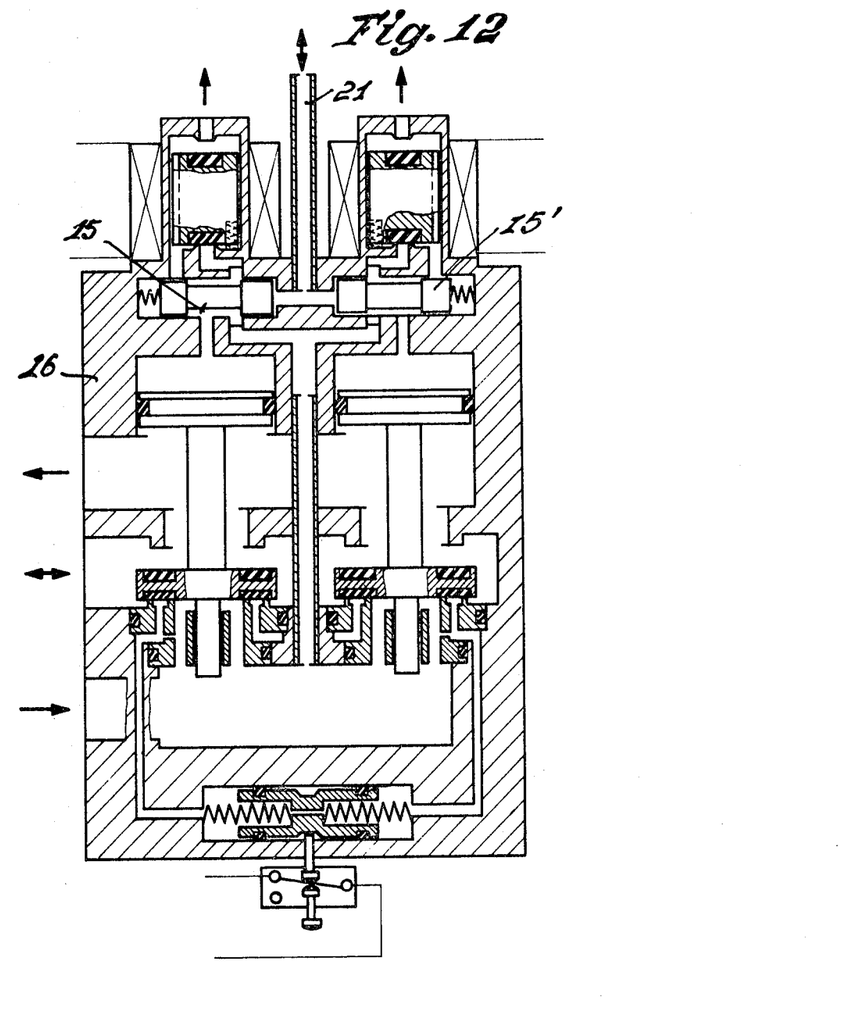
FIG. 12 shows the safety position in the absence of pressure buildup before the junction valve.

FIG. 11 shows the switched-off position under normal operation, and FIG. 12 shows the position of the two junction valves 15 and 15' in the case of an erroneous switching action caused by the absence of pressure in the pipe 21.

I claim:

1. A safety control arrangement for a servo-controlled machine, such as a press, brake or chuck, comprising: a first solenoid valve; a piston mechanism, fluid-operated from the pressure source of the servosystem through said first solenoid valve; a first junction valve and a first switch, both movable with the piston mechanism; an actuator for the first junction valve and switch, operable by the servo-controlled machine, but only so operable when the piston mechanism does not operate properly due to a failure or erroneous operation in the servo system; a second junction valve and a second switch, jointly movable by fluid from said source, through the first junction valve, said switches being in electric circuit with said solenoid valves; and means for supplying fluid pressure from said source, through the second solenoid and junction valves, to the pressure-responsive part of the servosystem.

2. A safety control arrangement according to claim 1, also including a housing for each set of junction and solenoid valves, and means for shifting the junction valve, relative to its solenoid valve, in said housing.

3. A safety control arrangement according to claim 1, including structural support means for the first solenoid valve, junction valve, and switch, and similar means for the second solenoid valve, junction valve and switch.

4. A safety control arrangement according to claim 1, also including multiple switch means in the electric circuit of said solenoid valves, and means to operate the same from the servo-controlled machine.

5. A safety control arrangement according to claim 1 wherein the actuator of the first junction valve can be shifted a predetermined distance by the servo-controlled machine, and can be shifted additionally by the coordinated auxiliary piston mechanism.